United States Patent [19]

Eykelboom et al.

[11] 3,887,589
[45] June 3, 1975

[54] 2,5-DIETHYL-4-HYDROXY-2,3,-DIHYDROFURAN-3-ONE

[75] Inventors: Adolf Jan Eykelboom, Zevenaar, Netherlands; Christiaan Herman Theodoor Tonsbeek, Orpington, England

[73] Assignee: Lever Brothers Company, New York, N.Y.

[22] Filed: May 23, 1972

[21] Appl. No.: 256,196

Related U.S. Application Data

[63] Continuation of Ser. No. 811,218, March 27, 1969, abandoned.

[30] Foreign Application Priority Data

Mar. 28, 1968 Netherlands .................. 6804336

[52] U.S. Cl. ........................... 260/347.8; 426/65
[51] Int. Cl. .................................... C07d 5/10
[58] Field of Search ........................... 260/347.8

[56] References Cited
UNITED STATES PATENTS 3,576,014  4/1971  Re et al. ..................... 260/347.8

OTHER PUBLICATIONS

Hodge et al., American Society of Brewing Chemists Proceedings (1963), p. 84–92.

*Primary Examiner*—Henry R. Jiles
*Assistant Examiner*—Bernard I. Dentz
*Attorney, Agent, or Firm*—Lever Brothers Company

[57] ABSTRACT

The invention relates to flavour improvers for bakery products.

The improved flavour results from the imcorporation, preferably before baking of a small amount of a 4-hydroxy-2,3-dihydrofuran-3-one of the general formula:

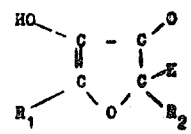

in which $R_1$ and $R_2$ represent lower alkyl groups containing 1 or 2 carbon atoms.

1 Claim, No Drawings

2,5-DIETHYL-4-HYDROXY-2,3,-DIHYDROFURAN-3-ONE

This is a continuation, of application Ser. No. 811,218, filed Mar. 27, 1969 and now abandoned.

The application relates to bakery products and to a process for the preparation of bakery products.

For the purposes of the present invention "bakery products" are defined as products that are used as raw materials for baking, as well as the products of baking. Examples are various types of bakers' margarine and shortening, baking powder, so-called improved flour, cake mixes, baking aids, as well as bread, rusks, biscuits, pastries and tarts.

It is known to prepare bakery products as defined above and to incorporate various emulsifiers and compounds like diacetyl, vanillin and the like. It has, however, been found that the flavour characteristics of the products thus prepared are still not entirely satisfactory and a further improvement has been looked for.

It has now been found that bakery products with improved flavour characteristics may be prepared by incorporating in these products a small amount of a 4-hydroxy-2,3-dihydrofuran-3-one of the general formula:

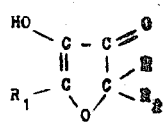

in which $R_1$ and $R_2$ represent lower alkyl groups containing 1 or 2 carbon atoms. A particularly improved flavour may be obtained in case a 4-hydroxy-2,3-dihydrofuran-3-one according to the general formula is added in which $R_1$ and $R_2$ each represent $—CH_3$.

The bakery products comprising a 4-hydroxy-2,3-dihydrofuran-3-one show improved flavour characteristics in the form of a more pleasant taste and a fresher impression of the baked product.

It has further been found that the improvement in flavour characteristics obtained according to the invention is only obtained by incorporating a 4-hydroxy-2,3-dihydrofuran-3-one according to the general formula in which both $R_1$ and $R_2$ represent lower alkyl groups as specified, and apparently not by incorporating a compound satisfying the general formula in which only one of the groups $R_1$ and $R_2$ represent a lower alkyl group, the other one representing hydrogen. Thus 5-methyl-4-hydroxy-2,3-dihydrofuran-3-one and the corresponding ethyl homologue when incorporated in bakery products do not yield improved flavour characteristics.

The 4-hydroxy-2,3-dihydrofuran-3-ones indicated show ketoenol tautomerism, but the compound normally predominantly occurs in the structure represented in the structural formula given above. This appeared among other things from the infrared and n.m.r. spectra. Theoretically, however, it may be expected that the compound can occur in various other tautomeric forms, such as the di-keto and the di-enol form.

By special techniques other tautomeric forms of mixtures thereof can be isolated from the various 4-hydroxy-2,3-dihydrofuran-3-ones which, however, are then again converted into the indicated form.

The present invention also includes the use of these other tautomeric forms of mixtures thereof in bakery products.

Instead of the 4-hydroxy-2,3-dihydrofuran-3-ones according to the general formula also precursors can be incorporated in the bakery products. Examples of such precursors are lower acyl esters of the enol form, ketals and lower alkyl ethers.

The hydroxydihydrofuranones which are used according to the present invention can be prepared by heating and reacting a diketo diester of the general formula:

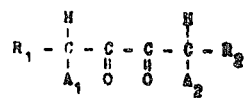

in which $R_1$ and $R_2$ represent an alkyl group containing 1 or 2 carbon atoms, with the provision that the number of carbon atoms of $R_1$ and $R_2$ together is from 3–4 and $A_1$ and $A_2$ represent acid radicals. The acid radicals may be derived from carboxylic acids, especially from lower aliphatic carboxylic acids. Preferred ester groups are those derived from acetic and propionic acid.

The reaction is carried out in an aqueous acidic medium which contains at least 50 percent by volume, preferably at least 75 percent of water, the remainder being a water-miscible polar solvent as e.g. a lower aliphatic alcohol as methanol and ethanol.

The acidic compound available in the aqueous acidic medium may comprise an inorganic acid, a carboxylic acid or, for example, an organic sulphonic acid. Suitable acids include hydrobromic or hydrochloric acid, sulphuric acid, phosphoric acid, formic acid, acetic acid, propionic acid, p-toluene sulphonic acid and the like. Polycarboxylic acids and hydroxycarboxylic acids are less suitable. The use of strong acids, showing a pH-value below 5 or rather below 4, is particularly preferred.

The amount of acid in the aqueous medium is not particularly critical and may vary widely. Good results have been obtained with amounts of 0.1–5 equivalents of acid per litre medium. Also the concentration of the diketo diester in the aqueous medium may vary widely. Generally, less than 200 grams of diketo diester are dissolved per litre of medium. For practical reasons, in particular to reduce the volume of the reaction mixture, the use of too dilute solutions is avoided. A practical range is from 10–100 grams of diketo diester per litre medium.

The reaction temperature and time of reaction are related. For convenient reaction periods in the range of 0.5–10, preferably from 1–5 hours, it is preferred to conduct the reaction at temperatures above 75°C, preferably at boiling temperature at atmospheric pressure. It is however possible to obtain a satisfactory conversion at lower temperatures e.g. of about 50°C, provided the reaction period is suitably adjusted to at least 20 hours.

After termination of the reaction the aqueous reaction mixture is allowed to cool and the desired dihydrofuranone derivative is isolated in a conventional way. This could be done e.g. by extraction with ether, drying of the etheral solution and evaporation of the solvent. Undesired polymeric contaminants are removed by distillation of the product under diminished pressure.

The diketo diester starting materials for the process according to the invention can be prepared in various ways. A convenient method is via acetylenic compounds.

Step 1 — Preparation of an alkyne diol.

Acetylene was coupled with two moles of aldehyde using two moles of a Grignard compound. This method is described in Bull. Soc. Chim. — France 425 (1956). Alternatively a 1-alkyne-3-ol could be coupled with formaldehyde as described in Annalen 596 525 (1955) or by coupling a 1-alkyne-3-ol and other aldehydes or ketone (as described in Bull Soc. Chim. supra).

Step 2 — Esterification of the alkyne diol.

The diacetates were conveniently prepared by reacting with acetic anhydride in the presence of e.g. pyridine or sodium acetate.

Step 3 — oxidation of the alkyne diester.

The alkyne diester was oxidized with dilute aqueous potassium permanganate at a low temperature yielding the diketo diester. This method has been described in Bull. Soc. Chim. (France) 789 (1949).

EXPERIMENT 1

This example describes the preparation of 2,5-diethyl-4-hydroxy-2,3-dihydrofuran-3-one.

2 moles of propionaldehyde were coupled with 1 mole of acetylene under the influence of ethylmagnesium bromide according to Bull. Soc. Chim. (France) 425 (1956) and 4-octyne-3,6 diol (b.p. 120°C at 4 mm) was obtained in 50% yield.

The alkyne diol (14.2 g or 0.1 mole) was acetylated by gently refluxing for two hours with acetic anhydride (20.4 g) in the presence of freshly molten sodium acetate (0.82 g). After cooling the reaction mixture was poured into a flask containing 200 g of crushed ice. The reaction mixture was extracted with ether and the organic layer separated. After washing repeatedly with small quantities of 5 percent aqueous sodium bicarbonate the etheral solution was dried over anhydrous sodium sulphate and the ether evaporated off. The residual liquid was distilled under vacuum and 4-octyne-3,6-diacetate (b.p. 103°–105°C at 2,3 mm) was obtained in 95% yield.

5.16 g (0.02 mole) of 4-ocytyne-3,6-diacetate were dissolved in 500 ml ethanol-water (90:10 by volume). To this solution which was cooled to −20°C were slowly added 17.5 g of potassium permanganate and 25 g of magnesium sulphate heptahydrate dissolved in 500 ml water. During this addition which took 2 hours the temperature was maintained at −20°C. After stirring for an additional 2 hours at the same temperature 200 ml of water were added and the brown reaction mixture was extracted three times with 200 ml portions of cold chloroform. The chloroform solutions were combined and dried over anhydrous sodium sulphate. Chloroform was evaporated off, and 60% of octane-4,5-dione-3, 6-diacetate were obtained.

5.16 g of octane-4,5 dione-3,6-diacetate was heated with 1500 ml of 0.5 N aqueous hydrochloric acid for 3 hours at a temperature of 100°C. After extracting with ether and combining the extracts, washing and drying took place. The solvent was evaporated and 4g of an orange coloured residue were obtained. The residue was distilled at diminished pressure and the distillate was investigated by means of gas-liquid chromatography which showed only one peak.

A sample was further investigated by preparative thin-layer chromatography and checked by infrared and mass spectrometry. 2,5-diethyl-4-hydroxy-2,3-dihydrofuran-3-one (m.p. −5°C) was found present in a yield of 35%. The smell of the product resembled closely that of the corresponding dimethyl compound.

EXPERIMENT 2

This example describes the preparation of 5-ethyl-2-methyl-4-hydroxy-2,3-dihydrofuran-3-one.

1 mole of 1 butyne-3-ol was coupled with 1 mole of propionaldehyde under the influence of ethylmagnesium bromide according to Bull. Soc. Chim. (France) 425 (1956) and 3-heptyne-2,5-diol (b.p. 109°–110°C at 2 mm) was obtained in 60% yield. The alkyne diol was acetylated as described in Experiment 1 and 3-heptyne-2,5-diacetate (b.p. 103°–105°C at 3mm) was obtained in 95% yield. The alkyne diacetate was oxidised with aqueous potassium permanganate as described in Experiment 1, also at a temperature of −20°C and heptane-3,4-dione-2,5-diacetate was obtained in 90% yield.

2.44 g of heptane-3,4-dione-2,5-diacetate was added to 750 ml of 0.5 N aqueous hydrochloric acid and the mixture was refluxed for 2 hours. After extracting with ether and combining the extracts, washing and drying took place. The solvent was evaporated and 2 g of a dark yellow residue were obtained. Gas-chromatography showed two peaks very closely together. Further attempts to separate the two peaks failed. Infrared and mass spectrometry suggest that 5-ethyl-2-methyl-4-hydroxy-2,3-dihydrofuran-3-one, possibly together with 2-ethyl-5-methyl-4-hydroxy-2,3-dihydrofuran-3-one, is present. The boiling point of the produce estimated from gas-liquid chromatography volatility is 208°–210°C. The yield of this product was 28%.

2,5-diethyl-4-hydroxy-2,3-dihydrofuran-3-one, of which the preparation and some properties have been described in Experiment 2, is a novel compound.

The threshold value of this compound is about 0.6 parts per million, whereas the threshold value of the known compound 5-ethyl-2-methyl-4-hydroxy-2,3-dihydrofuran-3-one has been determined to be about 1.2 parts per million.

The incorporation of a 4-hydroxy-2,3-dihydrofuran-3-one according to the general formula in bakery products may take place in various stages of the production process. Thus it can be added to the various baking ingredients, such as flour, bakers' fat or emulsifier before the dough or batter is prepared; it can be added to the dough or batter during kneading or stirring. It may be applied on the shaped dough, by coating, and the baked products may be sprayed with a solution containing the dihydrofuranone.

The bakery products as defined in this application comprise products which are used in the preparation of the baked products in various quantities, calculated on the weight of the finished product. Thus it is clear that e.g. of baking powder relatively small quantities are used, whereas the quantity of flour calculated on the finished product is much larger. Therefore also the quantity of 4-hydroxy-2,3-dihydrofuran-3-one according to the general formula, which is incorporated in various kinds of bakery products as described above, varies within wide limits. In the finished baked product quantities are used of at least 0.2 parts per million, as a rule, however, less that 200 parts per million; preferably or 0.4-50 parts per million. Calculated on the bakery products the quantity of 4-hydroxy-2,3-dihydrofuran-3-one added varies from a few parts per million with flour to a few per cents in aromatizing powders. In particular cases it may be desirable to incorporate more than one 4-hydroxy-2,3-dihydrofuran-3-one in a bakery product, as e.g. a combination of the 2,5-dimethyl compound and the 5-ethyl-2-methyl compound. In case such combinations are used the individual compounds may be incorporated in quantities below the threshold value of each of the compounds.

In those cases in which precursors are used, which mostly are not quantitatively converted into the desired product, proportionally more is used.

According to the invention bakery products, especially biscuits, buns and bread may be obtained with distinctly improved flavour characteristics, such as a fresher and more rounded impression. The improvement clearly appears particularly in those products in which the dihydrofuranone has been added before baking took place, in which case probably also conversion products of the furanone, possibly with other ingredients, play a part.

For obtaining a fresh impression and a good, rounded taste the dihydrofuranone is generally used in combination with compounds, such as diacetyl, lactones of delta-hydroxycarboxylic acids containing 8-14 carbon atoms, lower fatty acids, 4-cis-heptenal and their precursors, vanillin and its precursors, maltol, cyclotene (2-hydroxy-3-methyl-2-cyclopenten-1-one), ethone (1-(paramethoxyphenyl)-penten-1-one-3), ethoxymethyl coumarin, and further emulsifiers, such as diacetyl tartaric acid esters of monoglycerides and ecsences, such as butterscotch flavour and nut flavour.

By way of illustration the following Examples are given to elucidate the invention.

EXAMPLE 1 — PIPED SHORTCAKES

A shortcake dough was prepared with the following ingredients:
- 900 g flour
- 450 g sugar
- 500 g fat (obtained by crystallizing 70% hardened groundnut oil (m.p. 36°-38°C) and 30% soybean oil over a Votator)
- 130 g water
- 10 g salt
- 6 g baking powder The plastic fat and the sugar were mixed in a Hobart mixer (Type: CE100) for 3 minutes at speed 2. After adding the water, mixing proceeded for another two minutes. Subsequently the flour, the salt and the baking powder were added, after which the composition was mixed for 10 minutes. The dough was spouted on baking trays in in the shape of piped short-cakes and baked for 20 minutes at 180°C.

In an analogous way piped shortcakes were prepared in which, however, instead of 130 g water only 90 g water were used. Moreover, 40 ml of an 0.1% solution of 2,5-dimethyl-4-hydroxy-2,3-dihydrofuran-3-one in water were added to the dough.

The piped shortcakes were tested organoleptically in a pair test by a panel consisting of 41 persons. The piped shortcakes to which the furanone had been added were preferred by 33 persons of this panel. As a reason for this preference was mostly mentioned the more rounded taste which is reminiscent of freshly baked biscuits.

EXAMPLE 2 — PIPED SHORTCAKES

Piped shortcakes without incorporation of 2,5-diemthyl-4-hydroxy-2,3-dihydrofuran-3-one were prepared as described in Example 1.

In an analogous way aromatized piped shortcakes were prepared. When preparing the dough of these cakes the 130 g water were replaced by 90 g water and 40 ml of an 0.5% aqueous solution of 2,5-diethyl-4-hydroxy-2,3-dihydrofuran-3-one.

The shortcakes thus prepared were evaluated in a pair test by a panel consisting of 17 persons. The piped shortcakes containing the dihydrofuranone were preferred by 15 persons because of their savoury taste and smell.

EXAMPLE 3 — CAKE

With the following ingredients a cake-batter was prepared:
- 350 g flour
- 350 g sugar
- 350 g margarine
- 350 g whole chicken egg The margarine and the sugar were mixed in a Hobart mixer (type: CE 100) for 2 minutes at speed 2. Subsequently the eggs were added in five equal portions, while after each addition mixing took place for half a minute. Finally the flour and 0.57 g dextrin maltose were added, after which the whole batter was mixed for another half minute. The ready batter was put into cake moulds, each containing 250 g batter, after which the cakes were baked at 165°C for 55 minutes.

In an analogous way a cake-batter was prepared to which, instead of the dextrin maltose, now were added 0.60 g of a powder consisting of 2,5-dimethyl-4-hydroxy-2,3-dihydrofuran-3-one dried on dextrin maltose in a ratio of 1 : 21.2. Also from this batter cakes were baked.

In a triangle test both kinds of cake were tested by a testing panel consisting of 46 persons. Of these 29 persons indicated correctly the deviating sample, whereas moreover, of this latter group 21 persons preferred the product prepared with the furanone because of the better taste.

EXAMPLE 4 — CAKE

Cakes without incorporation of 2,5-dimethyl-4-hydroxy-2,3-dihydrofuran-3-one were prepared as described in Example 3.

In an analogous way aromatized cakes were prepared. The dextrin maltose which had been added when preparing the batter was now replaced by 0.60 g of a mixture consisting of one part of 2-methyl-5-ethyl-4-hydroxy-2,3-dihydrofuran-3-one and 40 parts of dextrin maltose.

The cakes thus prepared were evaluated by a panel in a pair test. The cakes containing 2-methyl-5-ethyl-4-hydroxy-2,3-dihydrofuran-3-one were generally preferred by the members of the panel.

EXAMPLE 5 — PREPARATION OF A PUMPABLE SHORTENING FOR ROLLED BISCUITS

To 5 kg of a molten fat phase consisting of 70% hardened arachis oil (slip melting point 34°–36°C) and 30% soybean oil were added 4 g of a fat-soluble butter flavour, consisting of a 10% solution in soybean oil of a mixture of glycerides of delta-hydroxy-carboxylic acids. These glycerides were obtained by esterification of glycerin with an equimolecular quantity of lactone of $C_{10}$ and $C_{12}$ delta-hydroxycarboxylic acid, respectively, removal of the non-converted glycerin and mixing in a weight ratio of 1 : 2. At the same time 10.5 g dextrin maltose were disposed in the fat phase. This fat phase was pumped from the premix tank, at a temperature of 45°C, to the A-unit of a laboratory votator. The shortening left this A-unit at a temperature of 15°C and was then conducted to a recrystallizer. Finally the fat was pumped to a tank in which it was kept with stirring at a temperature of 23°C.

In an analogous way a pumpable shortening was prepared in which now, besides 4 g of the above-mentioned butter flavour dissolved in fat, also 0.54 g of 2,5-dimethyl-4-hydroxy-2,3-dihydrofuran-3-one (11.0 g of the product dried on dextrin maltose in a ratio of 1 : 21.2) were added to the fat phase. With the two shortenings described above rolled biscuits were prepared from the following ingredients:

500 g pumpable shortening
415 g sugar
820 g flour
20 g water
4 g salt
7 g baking powder The ingredients in question were mixed in a Hobart mixer (type CE 100) for 5 minutes at speed 1. With the aid of a roller rolled biscuits were prepared from the dough thus obtained, which, after having been put on a baking tray, were baked for 18 minutes at 180°C.

The two types of rolled biscuits thus obtained were tested by a panel consisting of 28 persons. Of this group 20 persons preferred the sample containing the 2,5-dimethyl-4-hydroxy-2,3-dihydrofuran-3-one. As a reason for this preference it was mostly stated that the product gave a fresher impression.

EXAMPLE 6 — PREPARATION OF PUFF PAST MARGARINE AND SALT FINGERS

A puff paste margarine (1) was prepared, the fat phase of which consisted of 70% of hardened palm oil (slip melting point 42°–44°C) and 30% of soybean iol. To 1000 kg of this fat composition a water phase was added consisting of 100 l of water and 80 l of brine containing 6 kg of salt. From the fat and water phase a preliminary emulsion was prepared at 50°C. This emulsion was pumped to the A-unit of a votator. The emulsion left this A-unit at a temperature of 15°C and was subsequently conducted to a recrystallizer. Finally, the margarine obtained was led to a wrapping machine.

In an analogous way a puff paste margarine (2) was prepared the fat composition of which was identical with the one mentioned above, but the water phase of which was composed as follows:

92 l water
80 l brine containing 6 kg salt
8 l 1% solution of 2,5-dimethyl-4-hydroxy-2,3-dihydrofuran-3-one in water By means of the following ingredients a puff paste was then prepared:

500 g flour
80 g cake-margarine
420 g puff paste margarine (1) (preparation see above)
270 g water
10 g salt The dough was prepared by mixing the flour, the cake-margarine and the water in a Hobart mixer (type CE 100) for 10 minutes at speed 1. The dough thus obtained was allowed to stand for 15 minutes. Subsequently this dough was put in a star-shaped mould, after which the block of puff paste margarine was placed in the centre of this star. After folding the star the product was given two half turns in three (dough folded 3 times and rolled twice). After a resting time of half an hour the dough was given two half turns in three again. After another resting time of half an hour this operation was finally repeated once again. After the dough had been allowed to stand for another half hour it was folled out to a thickness of 0.3 cm, after which it was cut into strips of 6 × 1.5 cm. These strips were put on a baking tray, after which again a resting time of 1 hour followed. Finally the biscuits were baked for 12 minutes at 180° C. When leaving the oven the biscuits were sprayed with water and sprinkled with salt.

In an analogous way salt biscuits were prepared except that now the puff paste margarine (2) was used.

The two kinds of salt fingers, which were prepared in this way, were tested organoleptically by a panel of 26 persons. This panel preferred almost unanimously the sticks prepared with the puff paste margarine containing the 2,5-dimethyl-4-hydroxy-2,3-dihydrofuran-3-one.

EXAMPLE 7 — CAKE MIX

A cake mix was prepared by mixing the following ingredients to a free flowing powder:

1000 g cake-flour
700 g cake-margarine
180 g dried whole egg
800 g sugar
10 g baking powder
8 g salt
2.20 g of a mixture of 2,5-dimethyl-4-hydroxy-2,3-dihydrofuran-3-one and dextrin maltose (mixed and dried in a ratio of 1 : 21.1).

For the preparation of cakes 140 g water and 70 g whole egg were added to 900 g of this cake mix. This mixture was mixed in a Hobart mixer for 5 minutes at speed 3. The batter thus obtained was put into cake moulds, after which the cakes were baked for 60 minutes at a temperature of 165°C.

A tasting panel qualified the product thus prepared as a cake with good flavour characteristics.

EXAMPLE 8 — PREPARATION OF BREAD

A mixture of whey powder and polyphosphate was prepared as follows: in 15 l water at 40°–60°C was dissolved 1.65 kg of $Na_2H_2P_2O_7$. 3.35 kg whey powder were added, after which the mass was stirred for half an hour and subsequently dried in a spray-drier. The inlet temperature of the air was 170°–190°C. The final temperature of the product on leaving the spray-drier was 70°C. The ultimate moisture content of the product obtained was 2%. The particle size of the powder thus obtained was such that 75% had a particle size of less than 200 microns. This powder was mixed with 162 kg of a soft flour, viz. Dutch bread-flour of a soft quality, so-called W-flour, containing 9.5–10% of protein and 14–15% of moisture and the ash-content of which was 0.45%. In this way about 167 kg of an improved flour composition was obtained. To 1 kg of this flour was added 1 g of dextrin maltose.

In an analogous way a flour composition was made, to which per kg of flour was added 1.05 g 2,5-dimethyl-4-hydroxy-2,3-dihydrofuran-3-one dried on dextrin maltose (in a weight ratio of 1 : 21.2).

Of both flour compositions fancy bread was prepared with the following ingredients:
1000 g flour
560 g water
80 g fat (70% hardened groundnut oil, melting point 36°–38°C, and 30% soybean oil crystallized over a Votator)
20 g salt
50 g yeast The dough was made by kneading the mentioned ingredients in an Artofex kneader type P.H.C. for 20 minutes. The first rise was 30 minutes at 27°C. The second and third rises were 15 and 30 minutes, respectively, at 27°C, whereas the final rise was 55 minutes at 30°C. The fancy bread was subsequently baked in an oven for 25 minutes at a temperature of 230°C.

The bread thus obtained was tasted by a panel of 36 persons in a pair test. The bread to which 2,5-dimethyl-4-hydroxy-2,3-dihydrofuran-3-one had been added, had a distinctly fresh smell and taste, which was preferred by 29 persons of the panel.

EXAMPLE 9 — BAKING POWDER

A baking powder was prepared by mixing 31 kg sodium bicarbonate ($NaHCO_3$) and 8 kg acid calcium phosphate ($Ca(H_2PO_4)_2$) and afterwards grinding it in a ball mill for 1 hour. Subsequently 35 kg acid sodium pyrophosphate ($Na_2H_2P_2O_7$), 100 g magnesium carbonate, 21 kg potato starch and 6 kg 2,5-dimethyl-4-hydroxy-2,3-dihydrofuran-3-one dried on dextrin maltose (in a weight ratio of 1:21.2) were added to this mixture. After that the whole mixture was ground for another 2 hours.

The mixture thus obtained was inter alia used as baking powder in the preparation of piped shortcakes analogous to Example 1. Thus piped shortcakes with excellent flavour characteristics were obtained.

EXAMPLE 10 — PREPARATION OF FANCY ROLLS

Fancy rolls were prepared from bread-dough, composed according to Example 6, to which no 2,5-dimethyl-4-hydroxy-2,3-dihydrofuran-3-one was added. These rolls were baked in an oven for 20 minutes at a temperature of 230°C. The single weight of the rolls amounted to about 50 grams.

Subsequently the still warm rolls were coated with 0.5 ml per roll of a 0.01% aqueous solution of 2,5-dimethyl-4-hydroxy-2,3-dihydrofuran-3-one.

The rolls treated in this way were compared with non-treated rolls by a panel consisting of 27 persons in a pair test. 20 persons preferred the rolls obtained according to the invention. As a reason for this preference it was mostly stated that these made a fresher impression.

EXAMPLE 11 — PREPARATION OF PIPED SHORTCAKES

Piped shortcakes were prepared according to Example 1 while adding 2,5-dimethyl-4-hydroxy-2,3-dihydrofuran-3-one. 600 g of the piped shortcakes thus obtained were placed side by side on a baking tray. 3 ml of a 0.2% solution of 2,5-dimethyl-4-hydroxy-2,3-dihydrofuran-3-one in water were evenly distributed on them with a sprayer. The treated biscuits thus obtained were compared with the non-treated product in a triangle test. Of a panel consisting of 28 persons 22 persons discriminated in the right way. The treated sample was significantly preferred because of its better flavour characteristics.

What is claimed is:
1. A compound having a flavor of caramel with the structure 2,5-diethyl-4-hydroxy-2,3-dihydrofuran-3-one.

* * * * *